Feb. 24, 1953 — M. P. CHAPLIN — 2,629,533
MOLDED FIBER ARTICLE
Original Filed Feb. 8, 1941 — 4 Sheets-Sheet 1

INVENTOR.
Merle P. Chaplin

Feb. 24, 1953 — M. P. CHAPLIN — 2,629,533
MOLDED FIBER ARTICLE
Original Filed Feb. 8, 1941 — 4 Sheets-Sheet 3

INVENTOR
Merle P. Chaplin

Patented Feb. 24, 1953

2,629,533

UNITED STATES PATENT OFFICE 2,629,533

MOLDED FIBER ARTICLE

Merle P. Chaplin, South Portland, Maine, assignor to Chaplin Corporation, South Portland, Maine, a corporation of Maine Original application February 8, 1941, Serial No. 378,078. Divided and this application April 18, 1945, Serial No. 588,967

2 Claims. (Cl. 229—2.5)

This application is a division of parent application Serial Number 378,078, filed February 8, 1941, Patent No. 2,377,864 of June 12, 1945, on "Pulp Molding and Reforming and Article Produced Thereby," which parent application was a continuation in part of application Serial Number 144,439, filed May 24, 1937, now abandoned.

The present application is directed to molded pulp articles, and more particularly, open-faced articles, the walls of which are, in the main, preferably of substantially uniform thickness but certain portions of these walls are provided with exteriorly thickened areas and said articles have thickened reenforcing edges.

In certain of its preferred practical forms, the article of this invention comprises a contoured fibrous pulp body wall, forming a receptacle portion provided with an integral, thickened reenforcing edge about its periphery. Solid exterior ribs are formed integral with said body wall and the thickened reenforcing edge and merge into said thickened reenforcing edge and said exterior ribs are of uniformly interfelted fibre throughout the combined thickness of the ribs and the underlying portions of the body wall.

Features of the invention other than those referred to will be apparent from the following detailed description, when read in conjunction with the accompanying drawings.

The accompanying drawings show different practical embodiments of the invention and apparatus whereby the article may be produced, but the showing therein made is to be understood as illustrative only and not as defining the limits of the invention.

In the drawings:

Figs. 12-22 show a modified form of means for producing the invention wherein

In Figs. 23-33 I have illustrated still another form of means for producing the present invention wherein Figs. 23-24-25 correspond to the showing of Figs. 12-13-14.

Figure 1:
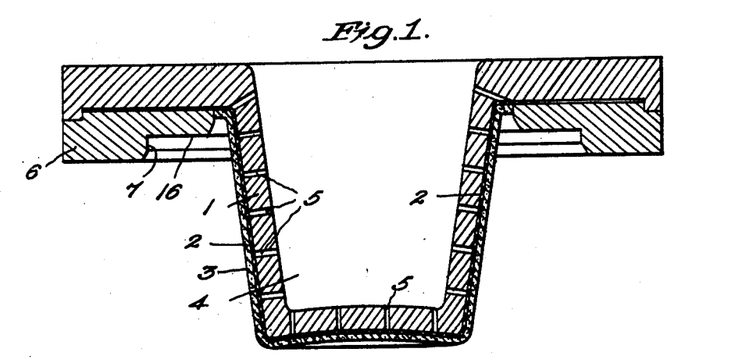
Fig. 1. Primary molding die on which the initial molded article is formed.

The pulp article or wet molded product is initially formed on a molding die 1, by depositing on a wire mesh covering 2, over the surface of this die, a layer of pulp 3, by means of suction, applied to the interior 4, while the die surface is immersed in a mixture of fibres and liquid. The die 1, has perforations 5, therethrough and the chamber 4 behind these perforations is normally closed by a cover or die carrier (not shown) to which connection is made to the source of suction. The wire mesh die covering 2 is held in place by a retaining ring 6 having a recess 7 to centralize reshaping ring 8 which is vertically slidable on surface 11 of a centrally disposed portion 10 of die 9. Springs 13 normally tend to move ring 8 to bring its flange 8a into engagement with flange 14a of another ring member 14 (see Fig. 3).

Figure 2:
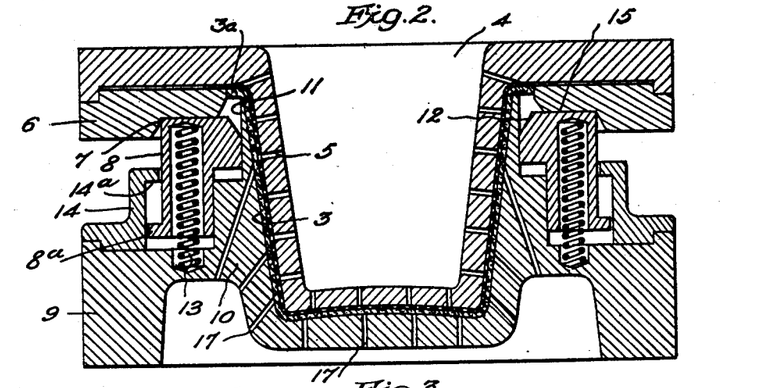
Fig. 2. The molded article of pulp on the primary molding die being compressed by the reforming die.

After the molded article 3 has been formed on the molding die 1, the pressing die 9 is used to compress the layer of pulp fibre on the die 1 and to remove it therefrom. As the die 9 is brought into cooperative position with the die 1 and the pulp layer thereon, the ring 8 on the pressing die first encounters the ring 6 on the forming die, and particularly, the recessed portion 7 and is guided into place by the bevel section thereon. After the outer surface 15 of the ring 8 has become seated on the surface 16 of ring 6, continued motion of the die 9 towards the die 1, compresses the springs 13, forcing the ring 8 downwardly over a portion of the die 9, and particularly, over the peripheral surface 11, until the internal surface of the section 10 of die 9 encounters the pulp article 3 on die 1, compressing the article between these two dies. The upper marginal flange 3a of the molded article 3 is not compressed during this operation and continues to project laterally outward as it was initially formed.

Figure 3:
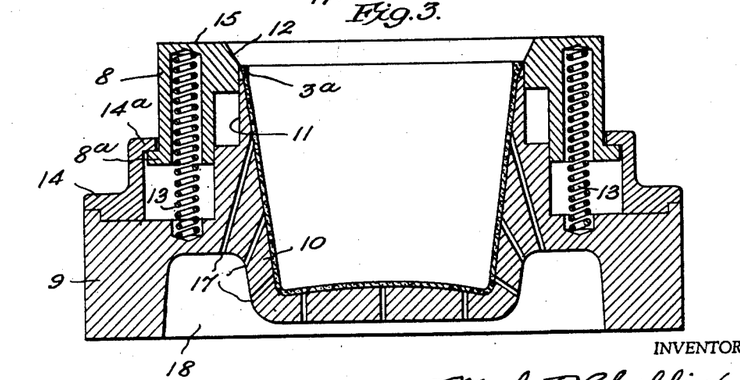
Fig. 3. A reforming die with a portion of the molded article partially reformed.

After the article has been thus compressed, the dies are separated and the molded article 3, is removed from die 1, and retained on die 9, as indicated in Fig. 3.

However, as the dies 1 and 9 separate, the spring 13 holds the ring 8 in contact with ring 6, insuring that the dies separate evenly and without misalinement, and as the ring 8 moves outwardly relative to die 9, the section 3-a is bent inwardly by the bevel section 12 on ring 8 as is indicated in Fig. 3. The article is retained on the inner surface of section 10 of die 9, by means of suction applied through holes 17 in this die, suction being applied to chamber 18 behind the die surface 10, which chamber is formed by a cover plate or die carrier (not shown).

Figure 4:
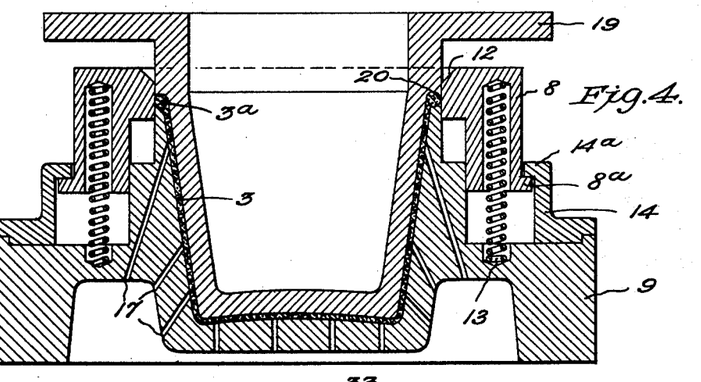
Fig. 4. The reforming die and a pressing die effecting additional reforming of a portion of the molded article.

For effecting further reshaping of the edge 3-a of the pulp article 3, a pressing die 19 is brought in contact with the pulp article 3 held by die 9, as is indicated in Fig. 4. This die 19 is guided into proper position with die 9 by means of the bevel portion 12 on the ring 8, the springs 13 holding the ring 8 in its outward position as shown in Figs. 3 and 4. It will be thus seen that this bevel portion 12 on ring 8 has a dual purpose. First, to effect partial reformation of a portion of the pulp article as is indicated in Fig. 3, and second, to guide pressing die 19 into proper position to effect a further reshaping of a portion of the molded article at 20 and to assist in such reformation.

The molded article 3 is then discharged or blown from die 9, by application of air pressure through holes 17, effecting the transfer of the molded article from die 9 to die 19. Immediately after being transferred to die 19 it is compressed by a drying die 21, which not only serves to compress the article against die 19, but also cooperates therewith to effect a final reforming of the edge portion 3-a of the article as is indicated in Fig. 5.

Figures 5, 6, 7, 8, 9, 10, 11:
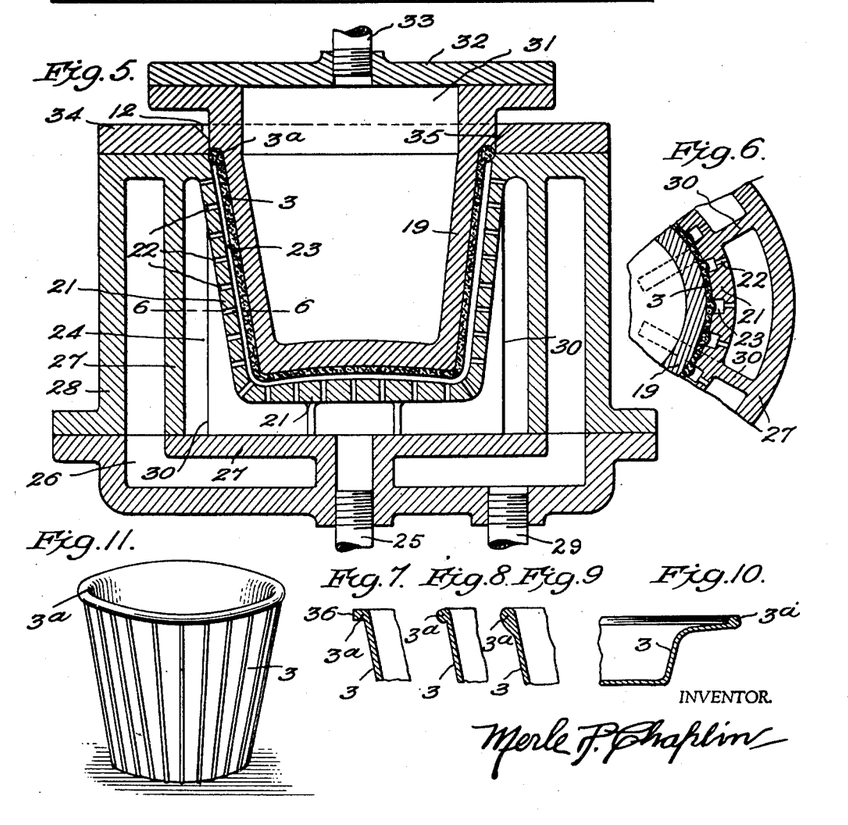
Fig. 5. The molded article held between the pressing die and a drying die effecting final reformation of a portion of the article and the drying of all the article.
Fig. 6. Section through pressing and drying dies on line 6—6 of Fig. 5.
Figs. 7-8-9-10. These illustrate modifications in shape of the reinforced portion.
Fig. 11. One type of article embodying this invention.

The drying operation performed in Fig. 5 is not included, per se, as a part of this invention and Fig. 5 is simply illustrative of the final operation on the article and more particularly, the completion of the reforming of edge portion 3-a.

It is further understood that the operation illustrated in Fig. 5 may be augmented by other operations and procedures performed on the pulp article prior to the final operation which operations and procedures are covered by copending application Serial No. 135,033, filed April 5, 1937, now forfeited. However, as the final stage of the reforming operation is included in the drying operation, the function of dies 19 and 21 will be described.

The die 21 is provided with an inner section having perforations 22 therein. These perforations may extend completely through the die or the inner surface may be provided with grooves or slots 23 through which vapor may escape. Behind the die 21 is a chamber 24 with a pipe 25, through which vapor from the article 3 may be drawn away. Surrounding the chamber 24 is a wall 27 on the outer side of which is an outer wall 28 enclosing a chamber 26, to which chamber may be supplied steam or other heating medium through pipe 29.

The heating medium introduced in chamber 26 heats the inner wall 27 of this chamber, heat from this wall being conducted to the die wall 21 by means of connecting ribs 30. These ribs serve to keep the inner wall 21 at a temperature which will vaporize the water or other liquid contained in the article 3 compressed between the die 21 and the die 19.

If desired, the die 19 may be heated by providing a cover plate 32 enclosing a chamber 31 on the interior of said die to which chamber steam or other heating means may be supplied through pipe 33. Providing heat to this die 19 will serve to hasten or speed up the removal of the water or other liquid from the article 3.

It will thus be seen that means has been provided through a specially constructed reshaping die and mechanism illustrated in Figs. 2 and 3 for reshaping a certain portion of the molded pulp article which portion may be finished in any desired shape as illustrated in Figs. 7, 8, 9, and 10.

It will also be observed that I have provided means for utilizing ordinary pulp molding methods in the forming of the original wet molded article or layer of pulp, which article or layer is thereafter immediately removed therefrom and subjected to the reshaping and finishing operations heretofore described, thereby releasing the molding die for the molding of a second or subsequent article.

Attempts to reshape the article or a portion thereof, while still retained on the forming die complicate the molding procedure and tend to injure the wire covering of the molding die or other foraminous surface thereon, as well as to plug the perforations in the molding die at this point and defeat the very purpose intended: namely that of providing surplus or extra pulp fibre materials at the point where reinforcing of the finished article is desired.

By providing auxiliary reshaping dies having smooth metal surfaces properly beveled and shaped, I am able to reform the surplus portion of the molded fibrous article provided by the molding die while the article is still moist and the fibres loosely interlocked, into a new shape, compacting the fibres into this new shape in a dense, uniform structure.

At no time, during the reshaping operation, are the fibres of the surplus rim section stretched or distorted from their original interlocked condition but rather, are folded over and reshaped on themselves, effecting the maximum utility of fibre strength for the particular section of the article where it is most needed.

There is illustrated in Fig. 7, a reinforced edge substantially square in outline. To produce this shape, die 19 would, at point 35, have a square or substantially square section instead of the rounded section shown in Fig. 5. And the upper margin of the cavity of die 21 would have an opposing square section instead of the rounded section shown in this latter Fig. 5.

The edge illustrated in Fig. 8 and in Fig. 9 is similar to that shown in Fig. 5. In Fig. 9 the reinforcing is carried down farther into the body of the sheet and is oval rather than round, as is shown in Fig. 8.

While the article taken for purposes of illustration is a relatively deep dish or cup, as shown in Fig. 11, the reforming operation herein described may be equally useful in providing a reinforced and finished edge or rim on a plate or dish such as is illustrated in Fig. 10.

In Fig. 11, there is shown a perspective view of a finished article, which may be produced by the methods heretofore described. The reinforced rim section is shown at 3-a, this corresponding to the section illustrated in Figs. 5 and 8. If desired, the surface of the article may be left in a condition, prior to its being placed in die 21, so that small ribbed or ridged sections may be pressed into slots 23 in die 21, as shown in Fig. 6, giving a distinctive and finished appearance to the exterior of the article. In case of a cup or similar article, these slightly ribbed or ridged sections will enable the cup to be more readily held in the hand than would be the case if the outer surface were entirely smooth.

Figures 16, 17, 19:
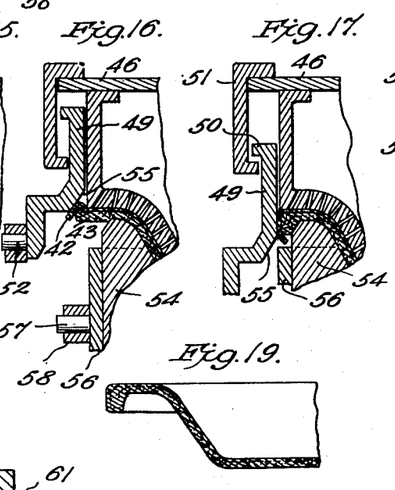
Figs. 16-17-18 are like views showing the primary shaping die cooperating with the secondary shaping die in different steps of the method.
Fig. 19 shows the product of the operations illustrated in Figures 16-17-18.
Figure 21:
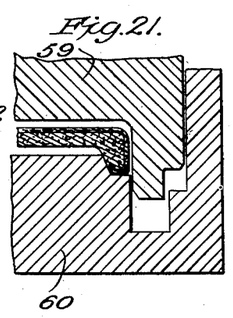

However, if the marks or ridged sections left by the slots 23 in die 21 are not desired, either the surface of the sheet, prior to its application to die 21, may be treated, or the article may be withdrawn slightly from the surface of die 21, by a slight outward movement of die 19 during the drying operations, the die 19 and the article being rotated slightly to bring the section opposite the grooves into position to be smoothed out by the smooth surface of the die 21, between these grooves. By properly arranging the time for moving the article and turning the same, relative to the drying operation and the hardening of the surface of the article adjacent to die 21, the exterior surface of the article may be finished entirely smooth, or substantially flush or, certain portions of the ridge structure or markings or indentations thereof may be left in the surface, effecting a distinctive and attractive appearance but with little or no projecting parts or portions of the article beyond its exterior surface.

The necessary mechanism for moving the various dies into or out of cooperative relation has intentionally been omitted, as well as the means for applying pressure and suction to the chambers back of the various dies. Also, the mechanism for rotating the die 19 where it is desirable to eliminate the groove marks of the drying die, or to impart a distinctive pattern to the article, has not been shown.

It is understood, however, that any suitable mechanism may be employed to first separate dies 19 and 21 by a slight amount, and while separated one of the dies is rotated about its axis an amount approximating one-half space between grooves 22 and 23 in die 21. The projections formed on the article by the slots are ironed out or pressed back into the article surface when the dies are again closed. It is, of course, understood that this operation is performed early in the drying cycle, and before the ridges or ribs formed on the article as well as the article itself have been thoroughly set. This is necessary as both ribs and articles are of substantially the same density and if the ribs are to be eliminated, the articles must still hold a substantial amount of moisture.

Figs. 12–22 illustrated a modified form of the invention as hereinafter more fully described. The showing in these figures may be utilized in practice to produce either a single or a multi-section article.

By single section article is meant a finished article formed initially from a single section of material upon an appropriate forming die. By a multi-section article is meant an article wherein a plurality of independently formed sections are superimposed upon one another and thereafter acted upon in accordance with the present invention to produce in effect a substantially integral end product. The advantage of the so-called multi-section article is that it permits the use of pulp of different grades to form different portions of the thickness of the article. For example, in the manufacture of a plate or the like, the article may be made with a lining of high grade pulp in order to give the desired appearance and finish, while the remainder of the thickness of the plate may be made from a less expensive material adapted to impart to the article the desired strength and rigidity. However, this arrangement may be reversed or modified in the manufacture of some articles. It is also within the purview of the invention to provide sections of the same or different materials on opposite sides of a section of a still different material.

Referring first to Figs. 12 and 13, 37 and 38 are two independent molding or forming dies of any appropriate shape and construction, but, in any event, so constituted that they are adapted to form upon their contoured surfaces a section of wet pulp from a liquid-pulp mixture. As shown in these figures said dies are of the suction type with a suction chamber 39 in the die 37 and a suction chamber 40 in the die 38. Suction passages 41 lead from the suction chambers to the contoured surfaces of the dies and, if desired, said contoured surfaces of the dies may be covered by the conventional screen. In practice these dies 37 and 38 are charged with pulp in any appropriate manner as by dipping them into a liquid-pulp mixture and exhausting water through the dies to deposit a pulp article on to each die. These operations are carried out independently although in practice the operations may be simultaneous. In any event, the desideratum is to obtain a wet formed pulp section 42 on the die 37 and a wet formed pulp section 43 on the forming die 38.

Figure 12:
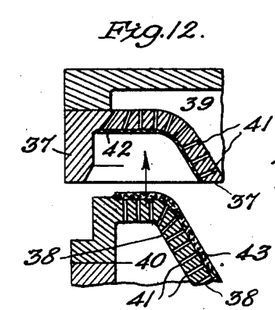
Fig. 12 is a fragmental radial section through this modified form illustrating a pair of forming dies adapted to cooperate with one another to superimpose independently formed article sections. This figure shows two forming dies separated.
Figure 13:
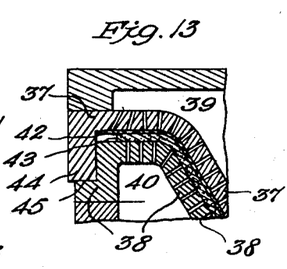
Fig. 13 is a view similar to Fig. 12, but showing the dies in position to superimpose one preformed section upon the other.

After these pulp sections have been formed on the respective dies, the dies are brought into substantial alinement, as shown in Fig. 12, and thereafter they are axially moved toward one another so as to deposit the section 42 on to the section 43 as shown in Fig. 13.

During this operation it is desirable that the sections be not compressed, but that the operation be merely one of superimposition. In order to accomplish this result and also to insure proper registration, the die 37 is provided at its outer margin with a depending flange 44 adapted to seat upon an abutment or stop 45 on the die 38, the parts being so proportioned that these parts will contact with one another before pressure is exerted upon the pulp sections.

During this operation, suction is preferably maintained on both of the dies, so as to hold the sections in place thereon. However, after the sections are superimposed as stated, suction is retained upon the die 38 while the suction is broken on the die 37, and, if desired, compressed air is introduced into the chamber 39 so as to remove the pulp section 42 from the die 37, so that when the die 37 is lifted, the superimposed pulp sections will be left on the die 38.

Figure 14:
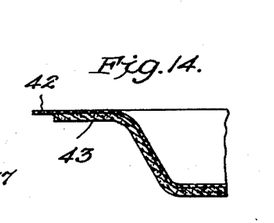
Fig. 14 is a similar section showing the product of the operations illustrated in Figs. 12 and 13.

The product of the foregoing operations is shown in Fig. 14. Here the article sections are shown as superimposed upon one another in wet uncompressed condition. This view also shows the marginal portion of the pulp section 42 extending beyond the outer periphery of the pulp section 43. This need not necessarily be so in accordance with this invention, but I prefer to make them this way, so that in the finished article, the outer edge of the pulp section 43 will be enclosed within the material of the section 42, this being particularly so in cases where the section 42 is made from a higher grade of pulp. The difference in size of the respective sections 42 and 43 is provided for by appropriate construction of the dies 37 and 38 as will be well understood.

After the forming die 37 has been withdrawn from the die 38, as described, the two superimposed pulp sections will be left in the die 38. This latter die is thereupon brought into cooperative relation with a primary shaping die shown as the upper die in Fig. 15 and indicated generally by the reference character 46.

This primary shaping die is shown as comprising a die body 47 having a foraminous contoured face 48. The die body is embraced by a shaping ring 49 exteriorly flanged at its upper end, as indicated at 50, to operate within a limiting ring 51. The die body is mounted on any suitable support or apparatus whereby it may be bodily manipulated while the axial movement of the shaping ring is adapted to be independently controlled. This control may be accomplished in various ways and its movements may, in some cases, be spring actuated, as indicated in Figs. 2-3-4 of the drawings. However, I have found it possible to positively control the operations of this ring in a manner to obtain results not heretofore accomplished in this art. Various forms of mechanical means may be utilized for this purpose, but in Fig. 15 I have shown a simple form which is thoroughly practical for production purposes. Here the ring is shown as provided with a cylindrical lug 52, it being understood that a plurality of these lugs are positioned about the periphery of the ring to extend radially outward therefrom and with each pin is associated a clevis 53 which constitutes the operating means therefor. These clevises are connected by suitable mechanism to any appropriate prime mover by which the ring may be moved axially of the die at predetermined intervals and in timed relation to the operations of the die.

Figure 15:
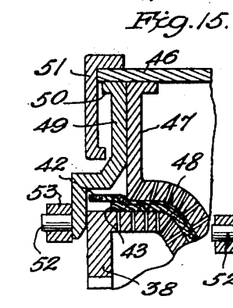
Fig. 15 is a fragmental radial section showing the transfer of the product of Fig. 14 from one of the forming dies to a primary shaping die.

When the forming die 38 with the sections 42 and 43 thereon is brought into axial alinement with the primary shaping die 46, these dies are brought together so that the bodies of the superimposed sections are compressed between the contoured surfaces of these dies as indicated in Fig. 15. It will be noted, however, that the marginal portions of both sections which constitute the edge portion of the assembly extend beyond the compression surface of the upper die 47 so that, as the bodies of the sections are compressed together, the said edge portions of the article are not compressed, but are left in the original wet formed condition. During this compressing step of the method the shaping ring 49 is held in elevated position, but its lower end overlaps the outer periphery of the lower die so as to guide and center these dies prior to contact of the shaping die with the article.

After the parts have been brought into the position shown in Fig. 15 and the body of the article compressed as stated, suction is applied to the primary shaping die, while suction in the forming die 38 is discontinued and, if desired, compressed air admitted to insure that when the dies are separated, the sections 42 and 43 will remain on the die 46. The die 38 is now removed and a secondary shaping die 54 is brought into cooperation with the primary shaping die 46 as shown in Fig. 16. These two dies are forced firmly together on the intermediate article as shown, preferably further compressing the portion of the body of the article interposed between them.

Figure 18:
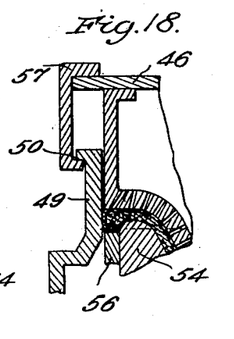

While the article is being held firmly between these dies as shown, the shaping ring 49 is lowered by its operating clevises 53, thereby causing a tapered portion 55 in the bore of this ring to act upon the still wet uncompressed edge portion of the article, as shown in Fig. 16. Inasmuch as the section 42 projects beyond the section 43, the projecting portion of the former section will be acted upon first and deflected downwardly over the outer edge of the section 43, as clearly shown in this figure. As the operation progresses, however, the more constricted part of the tapered portion 55 will shape the edge portions of both sections 42 and 43 simultaneously until the tapered portion 55 has passed beyond contact with these edge portions to leave them in the condition shown in Fig. 17. This having been accomplished, said edge portions are next acted upon by a shaping ring 56 which slidably embraces the secondary shaping die 54 and is of a size to be received within the cylindrical bore of the upper shaping ring 49. The ring 56 is adapted to be positively operated in timed sequence with the operations of the ring 49. This ring 56 may be positively operated as is the case with the ring 49 by any suitable mechanism, but, for the purpose of illustration, I have shown the ring 56 as operated in substantially the same manner as the ring 49. In this instance the ring 56 has a plurality of pins 57 with operating clevises 58. The timing is such that after the ring 49 has been lowered into the position of Fig. 17, while the ring 56 is in a lowered position, this ring 56 is now elevated and compresses the previously uncompressed and still wet edge portion of the article to substantially the same density as the remainder of the body and simultaneously shapes the same as shown in Fig. 18, wherein it is in approximately its final form. If desirable, drainage openings may be provided to permit of the exit of any water which may be expressed during this operation. At the conclusion of the step described in connection with Fig. 18, the product article is as shown in Fig. 19.

In practice the compression to which the body of the article and the edge portion thereof has been already subjected as described may be sufficient for the purposes intended, in which case the product of Fig. 19 may be dried in any suitable manner and thus prepared for the market. However, in the preferred form of this invention, I prefer to subject the article of Fig. 19 to a further and final die finishing and drying step.

The article of Fig. 19, therefore, after being removed from the dies 46 and 54 of Fig. 18, is brought into cooperation with finishing dies 59 and 60 which are preferably heated dies and which dies are preferably provided with any appropriate means for extracting the vapor which results from heating the still moist article between heated dies.

These dies 59 and 60 are shown as interfitting and self centering. As the die 59 approaches the die 60, the outer periphery of the die 59 telescopes into an upstanding peripheral wall 62 on the die 60 which causes the dies to be centered and guided into proper registration. As the die 59 nears its seat, a depending flange 63 on said die enters into an annular recess 64 in the die 60 with the inner face 65 of the flange having a very close clearance with the surface 66 of the die 60. The surface 65 is so proportioned, however, that when the article is resting upon the contoured surface of the die 60, the surface 65 will clear the outer periphery of the article as the die 59 moves downwardly to its seat, thereby avoiding any possibility of damage to the still moist edge portion of the article or any possibility of carrying any portion thereof into the recess 64. Thus by the time the dies come into the position shown in Fig. 21 and before they actually exert any pressure upon the article, the compression space between the dies is completely closed. The dies continue to move together until they reach the positions shown in Fig. 22 and in the interim force and further compress the article into its final form while the heat of the dies produce the desired finish.

Figure 20:
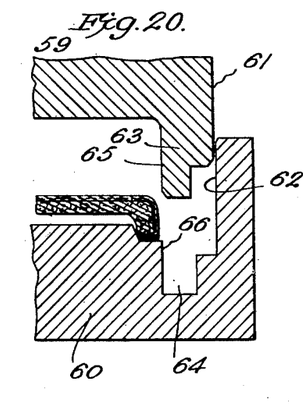
Figs. 20-21-22 are similar sections showing progressive steps of final compressing and finishing of the article. These figures are on a larger scale in the interest of clearness.
Figure 22:
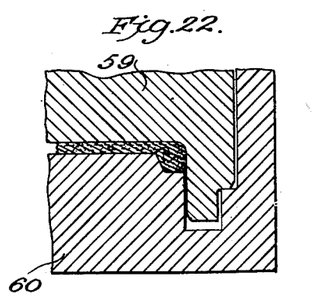
Figures 26, 27, 28, 29, 30, 31, 32, 33:
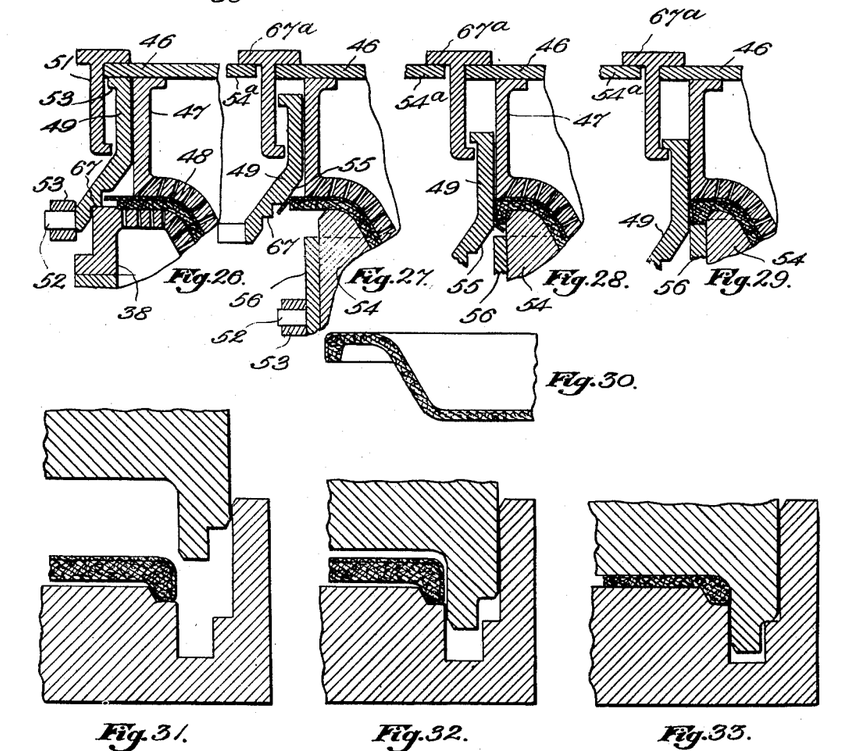
Figs. 26-27-28-29 correspond to the showing of Figs. 15-16-17-18 with the structure modified to incorporate limiting stops which bring about a modified form of operation constituting a modified method.
Fig. 30 is a fragmental section of the product of the method steps shown in Figures 26-27-28-29.
Figs. 31-32-33 show consecutive die positions in compressing and finishing the product shown in Fig. 30.

It is to be noted that the article contacting faces of either or both of the dies 59 and 60 or Figs. 20–21–22 and the corresponding dies of Figs. 31–32–33 may be provided with vapor escape grooves or ducts like the grooves 23 of Figs. 5–6. These vapor escape ducts, which are formed in the face of the die which directly contacts the article without any intervening mesh or the like, are so located in the face of the die as to extend in the direction of the draw of such die. Ordinarily I employ these vapor escape grooves only in the face of one die, although they may be provided in both dies, or, if desired, in parts of surfaces of either or both dies.

When I compress the still moist article against a surface of a die provided with such vapor escape ducts, I apply sufficient pressure to cause small portions of the damp blank which are juxtaposed with the ducts to be squeezed or projected into these grooves and, since either or both of the dies are of the heated variety, the water remaining in the article will be vaporized and led off through the vapor channels or ducts, so that the article is dried and the fibres of the article are fixed and set in this condition permanently. Consequently, the article, when removed from the dies in this dried and set condition, will have (if these vapor channels are incorporated in the die) an external ribbed formation or pattern, generally indicated in Fig. 11.

These external ribs on the article may be made of any desired width, shape or pattern without departing from this invention. However, in practice, I make them quite narrow with respect to the spacing between them for the reason presently explained. I have found that the ribs should, for the best results, be made so narrow that, when pressure is applied by the die to the parts of the article between the ribs to produce wall sections of final thickness, the compression exerted thereon will be transmitted through the fibers across the relatively small spacing between the zones of applied pressure (i. e., across the duct), so as to bridge the foundations of the ribs and thus harden and compact the same, and thereby eliminate lines of weakness in the inner strata of the article.

With this mode of operation, the initial drying die pressure on the article produces the ribbed pattern thereon and the dies, being heated, immediately thereafter set and fix the fibres in and adjacent to the ducts, thereby forming a bridge across the duct, enabling heat and pressure to be imparted uniformly thereafter throughout the entire body of the article to complete the drying and finishing operation.

The article is held between the dies as in Fig. 22 until the finishing operation is completed. The dies are then separated and the article removed and may be in the condition for the market. It will be understood, however, that further and additional steps may be added, although these are not ordinarily necessary.

In the apparatus and method as described in connection with Figs. 12–22, two independently formed pulp sections are initially prepared and assembled. The invention, however, may be carried out by dispensing with one of these sections, in the event that one grade of pulp only is desired. The invention is to be understood as broad enough to cover this procedure, as well as the formation and finishing of an article made up from more than two wet-formed sections superimposed as described.

In all of the methods and apparatus which have hereinbefore been described, the body of the article is compressed, while the edge portion of the article remains in original wet formed state and this edge portion is thereafter or subsequently shaped and pressed into its final form either by one or a plurality of steps as the case may be. In other words, one portion of a wet formed or molded article is compressed, while another portion of the same article in the wet formed state is subsequently and while still wet in turn shaped and compressed into its desired final shape.

According to the methods already described herein, the body of the article is first compressed and the edge portion thereafter shaped and compressed. It is within the purview of this invention, however, to reverse these operations, i. e., to shape and compress the edge portion of the article while the body of the article remains in its initial wet formed state, and, thereafter, and as a subsequent step, compress this still wet body into substantially its final form.

The apparatus and method whereby this latter procedure is accomplished are illustrated in Figs. 23-33.

Figure 23:
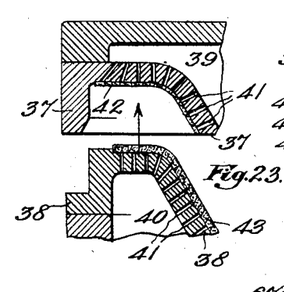
Figure 24:
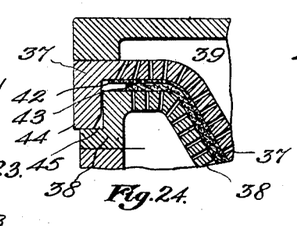
Figure 25:
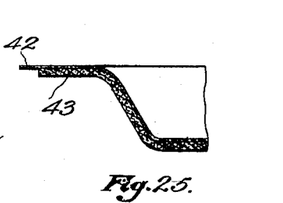

The method of these latter figures commences identically with the method of Figs. 12-22. Thus the steps of the method of Figs. 23-24 are identical with those carried out in Figs. 12-13 and yield the product of Fig. 25 identical with the product of Fig. 14. Furthermore the product of Fig. 25, while on the forming die 38, is brought into cooperative relation with a primary shaping die 46 identical with the primary shaping die of Fig. 15 with two important exceptions. The first is that in Fig. 26 the shaping ring 49 is provided with an internal stop or abutment 67, so placed that it will abut against and seat upon the die 38 before the die 46 can exert pressure upon the formed sections of the article between these dies. In other words, the ring 49 acts as a positive spacing ring for positively spacing the dies apart in such manner that their contoured surfaces can never come closer to each other than the maximum thickness of the formed article sections. Consequently, when the dies are brought together, as shown in Fig. 26, the formed article remains in its wet formed condition free from compression instead of the body thereof being compressed as in Fig. 15. The second exception to identity is that the limiting ring, which is rigid with the die 48, is provided with a flange having an abutment 67-a adapted, as hereinafter described, to coact with a stop 54-a rigid with the die of 54.

After the parts have been brought into the position and condition shown in Fig. 26, the die 38 is removed and the die 46 with the article thereon is brought into cooperative relation with the secondary shaping die 54 as shown in Fig. 27, but here again the dies 46 and 54 are not utilized to compress the body of the article, but are positively spaced apart by engagement of abutment 67-a with the stop 54-a, so that they do not compress the body of the article in this position at any point during the operations of any of Figs. 27-28 or 29.

It will be noted, however, that the operations disclosed in Figs. 27-28-29 with respect to the movements of the shaping rings 49 and 56 are the same as described with respect to Figs. 16-17-18 in that the tapered portion 55 of the shaping ring deflects the still wet edge portion through the position of Fig. 27 into the position of Fig. 28 and thereupon the shaping ring 56 is elevated to further shape and compress the still wet edge portion into the form of Fig. 29.

Thus, as the article comes from the dies after completion of the method step of Fig. 29, it is the article of Fig. 30 wherein the thickened reinforcing edge portion has been compression shaped into approximately final shape, while the remainder of the article, i. e., the body thereof, is in a still wet, original, uncompressed, molded condition.

After the article of Fig. 30 has been produced as stated, it is then introduced between drying and finishing dies, as shown in Figs. 31-32-33 and therein subjected to heat and compression to dry and finish the same, the dies being of the same character as specified in connection with Figs. 20-22.

While I have described my invention with particular regard to the production of an article, such as a cup, plate or dish, it will be readily understood that my invention is capable of producing a wide variety of articles, particularly those where reinforcement is necessary or desirable about a rim or edge which may become broken or bent when the article is used. Many modifications can be made in the shape of the reinforced section, other than those illustrated herein, without departing from this invention.

In the foregoing disclosure I have shown, particularly in Fig. 11 of the drawings, for the purpose of illustration, a circular article as the product of my dies and methods. This invention is, however, manifestly not limited to a circular article as the article may have a curvilinear, or a polygonal form, or a combination of these forms. Moreover, the so-called shaping rings which have been described in connection with different embodiments of the invention have been referred to generally as operating upon the edge or marginal portion of the article throughout its entire extent. However, it is within the present inention to so constitute this ring or these rings or equivalent members, with appropriate modification of the die structure, so that said rings will operate upon all or only on such portion or portions of the marginal edge as it may be desired to reinforce.

"Hot pressure die dried finish," as used in the appended claims, defines a surface finish which results from pressing an initially wet molded article against the surface of a hot die and drying the article while in pressure contact with the die.

"Hot vapor dried finish," as used in the appended claims, defines a surface finish which results from drying the surface of an initially wet molded article in the presence of hot vapor and without direct contact with a heated surface.

"Interfelted fibres" is used in the appended claims to describe the matted interlocked condition of the pulp fibres resulting from molding or depositing them from a liquid-pulp mixture on a foraminous die.

"Compression altered" or "Compression treated," as referred to in the appended claims, is intended to describe that physical state or condition of the molded fibrous pulp which results from compression thereof by a heated die under sufficient pressure to actually compress the pulp in the presence of moisture to decreased thickness.

Having thus described my invention what I claim is:

1. A molded pulp article comprising: an open faced fibrous pulo receptacle body, the inner surface of which has a "hot pressure die dried finish" and is smooth and unobstructed, an integral thickened reinforcing edge about the periphery of the receptacle body and also having a "hot pressure die dried finish," the wall of said body being exteriorly thickened at intervals to form solid integral ribs on the outer surface of said receptacle body extending outwardly and merging into said reinforcing edge, the outer surface of said receptacle body having a "hot pressure die dried finish" between the ribs and the ribs themselves having a "hot vapor dried finish."

2. As a new article of manufacture, a compressed molded fibre open faced receptacle body comprising: permanently superimposed wet-bonded molded fibre sections one of which constitutes the base section to impart strength and rigidity and the other of which constitutes the liner section to impart finish, said receptacle body being provided about its periphery with a compressed integral thickened reinforcing edge containing the marginal portions of both sections with the liner section extending about and peripherally enclosing that portion of the base section which is incorporated in said reinforcing edge, the wall of said base section being exteriorly thickened at intervals to form ribs having a "hot vapor dried finish" while the remainder of the exposed surface of the base section has a "hot pressure die dried finish" and all exposed surfaces of the liner section also having a "hot pressure die dried finish."

MERLE P. CHAPLIN.

REFERENCES CITED

The following references are of record in the file of this patent:

UNITED STATES PATENTS

| Number | Name | Date |
|---|---|---|
| 1,574,259 | Sarff | Feb. 23, 1926 |
| 1,668,101 | Bothe | May 1, 1928 |
| 1,865,742 | Chapman | July 5, 1932 |
| 1,986,824 | Keiding | Jan. 8, 1935 |
| 2,014,297 | Ruthledge | Sept. 10, 1935 |
| 2,023,470 | Hart | Dec. 10, 1935 |
| 2,274,095 | Sawyer | Feb. 24, 1942 |
| 2,348,725 | Chaplin | May 16, 1944 |